(12) United States Patent
Kerselaers et al.

(10) Patent No.: US 11,558,836 B2
(45) Date of Patent: Jan. 17, 2023

(54) NOISE RESPONSIVE NEAR-FIELD COMMUNICATIONS DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/987,424

(22) Filed: Aug. 7, 2020

(65) Prior Publication Data
US 2022/0046568 A1 Feb. 10, 2022

(51) Int. Cl.
*H04W 56/00* (2009.01)
*H04B 17/345* (2015.01)
*H04B 5/00* (2006.01)

(52) U.S. Cl.
CPC ...... *H04W 56/0015* (2013.01); *H04B 5/0025* (2013.01); *H04B 17/345* (2015.01)

(58) Field of Classification Search
CPC ............. H04W 56/0015; H04B 17/345; H04B 5/0025
USPC ...................................................... 455/41.1
See application file for complete search history.

(56) References Cited

U.S. PATENT DOCUMENTS

| | | | |
|---|---|---|---|
| 9,197,986 B1 | 11/2015 | Kerselaers et al. | |
| 9,730,094 B2 | 8/2017 | Kairouz et al. | |
| 2003/0224751 A1* | 12/2003 | Vanderhelm | H04B 1/126 455/296 |
| 2009/0081943 A1* | 3/2009 | Dobyns | H04B 5/00 455/1 |
| 2011/0217925 A1* | 9/2011 | Rhodes | H04B 5/00 455/63.1 |
| 2013/0317783 A1* | 11/2013 | Tennant | G10L 21/0208 702/191 |
| 2015/0071254 A1 | 3/2015 | Wilhelmsson et al. | |
| 2015/0319545 A1 | 11/2015 | Kerselaers et al. | |
| 2016/0309420 A1 | 11/2016 | Verma et al. | |
| 2017/0041881 A1* | 2/2017 | Won | H04W 52/223 |
| 2017/0272128 A1 | 9/2017 | Tanaka | |
| 2020/0083962 A1 | 3/2020 | Gomme et al. | |

* cited by examiner

*Primary Examiner* — Eugene Yun

(57) ABSTRACT

One example discloses a near-field wireless communications device, including: a near-field antenna; a near-field noise detector coupled to receive a first set of near-field signals from the near-field antenna; wherein the near-field noise detector is configured to identify a set of attributes of the near-field noise within the first set of near-field signals; a controller configured to generate at least one synchronization signal based on at least one of the attributes of the near-field noise; and a transmitter circuit configured to transmit a second set of near-field signals in response to the synchronization signal.

19 Claims, 6 Drawing Sheets

NOISE RESPONSIVE NEAR-FIELD COMMUNICATIONS DEVICE

The present specification relates to systems, methods, apparatuses, devices, articles of manufacture and instructions for near-field communications devices.

SUMMARY

According to an example embodiment, a near-field wireless communications device, comprising: a near-field antenna; a near-field noise detector coupled to receive a first set of near-field signals from the near-field antenna; wherein the near-field noise detector is configured to identify a set of attributes of the near-field noise within the first set of near-field signals; a controller configured to generate at least one synchronization signal based on at least one of the attributes of the near-field noise; and a transmitter circuit configured to transmit a second set of near-field signals in response to the synchronization signal.

In another example embodiment, the synchronization signal includes a timing command; and the transmitter circuit is configured to transmit the second set of near-field signals at a time specified in the timing command.

In another example embodiment, the synchronization signal includes a timing command; the second set of near-field signals are divided into a set of data packets; and the timing command specifies a time that at least one of the data packets in the set of data packets is to be transmitted.

In another example embodiment, the synchronization signal includes a data packet length command; the second set of near-field signals are divided into a set of data packets; and the transmitter circuit is configured to set a length of at least one of the data packets to a data packet length specified in the data packet length command.

In another example embodiment, the synchronization signal includes both a timing command and a data packet length command; the second set of near-field signals are divided into a set of data packets; the transmitter circuit is configured to set a length of at least one of the data packets to a data packet length specified in the data packet length command; and the timing command specifies a time that at least one of the data packets in the set of data packets is to be transmitted.

In another example embodiment, the set of attributes correspond to a quasi-periodic pattern in the near-field noise.

In another example embodiment, the controller is configured to statistically characterize the set of attributes in the near-field noise over a predetermined time period.

In another example embodiment, the set of attributes of the near-field noise includes a burst portion and a quiescent portion.

In another example embodiment, the controller is configured to command the transmitter circuit to begin transmission of the second set of near-field signals after a predetermined delay following an end of the burst portion of the near-field noise.

In another example embodiment, the controller is configured to set the predetermined delay based on either a mean, median, or standard deviation of a duration of the burst portion of the near-field noise.

In another example embodiment, the controller is configured to command the transmitter circuit to begin transmission of the second set of near-field signals after a predetermined delay following a start of the burst portion of the near-field noise.

In another example embodiment, the controller is configured to command the transmitter circuit to set a data packet length of the second set of near-field signals based on either a mean, median, or standard deviation of a duration of the quiescent portion of the near-field noise.

In another example embodiment, the data packet length varies as either the burst portion or the quiescent portion of the near-field noise signal vary.

In another example embodiment, the near-field antenna includes an electric (E) near-field antenna and a magnetic (H) near-field antenna; the near-field noise includes near-field electric noise; and the controller is configured to generate the synchronization signal based only on the pattern in the near-field electric noise.

In another example embodiment, the near-field antenna includes an electric (E) near-field antenna and a magnetic (H) near-field antenna; the near-field noise includes near-field magnetic noise; and the controller is configured to generate the synchronization signal based only on the pattern in the near-field magnetic noise.

In another example embodiment, the near-field antenna includes an electric (E) near-field antenna and a magnetic (H) near-field antenna; the near-field noise includes both near-field electric noise and near-field magnetic noise; and the controller is configured to generate the synchronization signal based on the pattern in both the near-field electric noise and the near-field magnetic noise.

In another example embodiment, the near-field antenna includes an electric (E) near-field antenna and a magnetic (H) near-field antenna; and the controller is configured to modulate a ratio of energy sent to and/or received from each of the electric and magnetic antennas in response to a ratio of near-field electric noise and near-field magnetic noise.

In another example embodiment, the device is embedded in at least one of: a smart phone, a smart watch, a sensor, a medical sensor, an earbud, or an audio device.

In another example embodiment, the near-field antenna includes at least one conductive surface; and wherein the conductive surface is configured to carry non-propagating quasi-static near-field electric induction signals.

In another example embodiment, the near-field antenna includes at least one coil; and the coil is configured to carry non-propagating quasi-static near-field magnetic induction signals.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
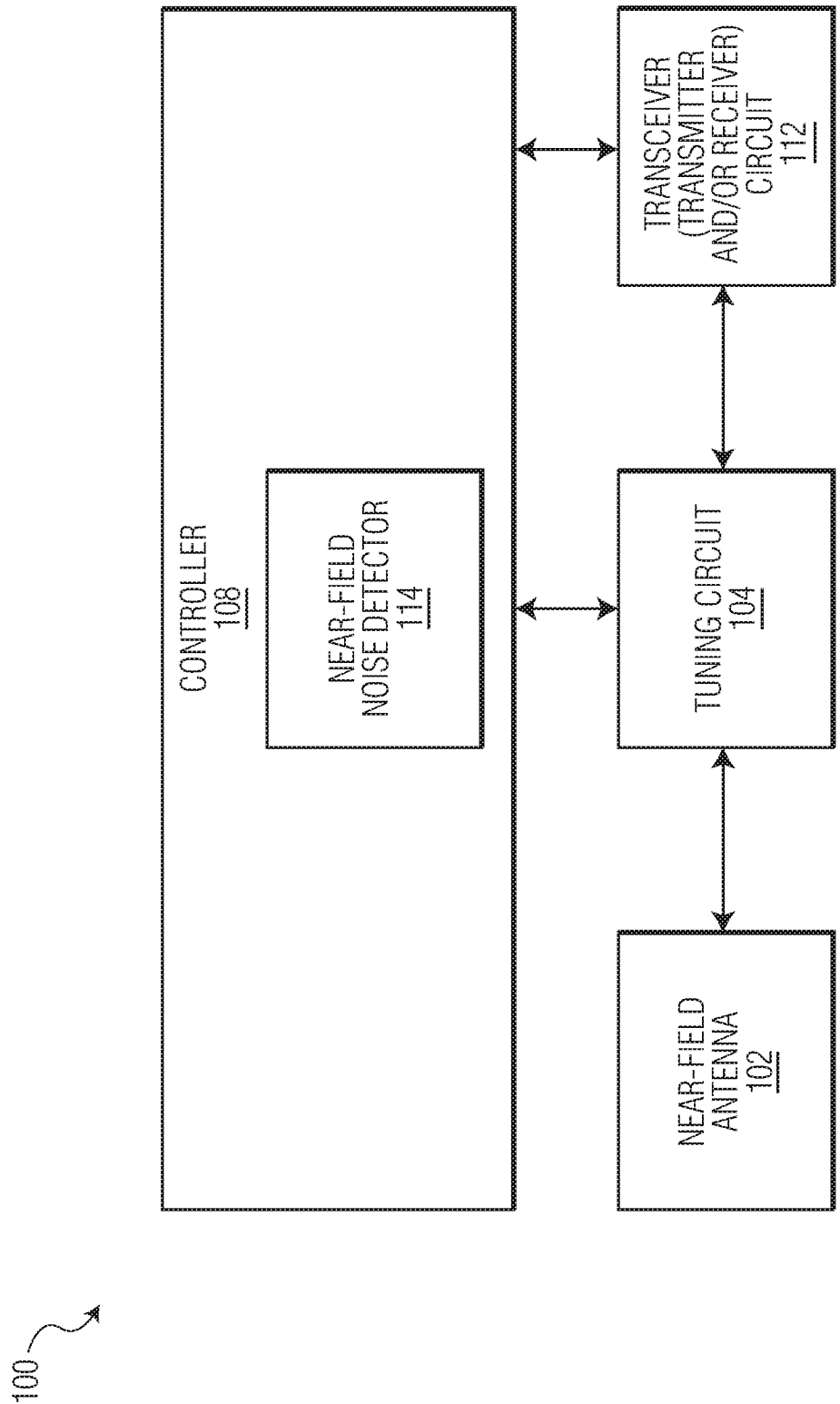
FIG. 1 is a first example of a near-field wireless device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between one or more near-field devices on a user's body or the body of a conductive surface (i.e. on-body devices), and other conductive surfaces and/or other wireless devices (i.e. off-body devices) based on either near-field electromagnetic induction (NFEMI), where the transmitter and receiver are coupled by both magnetic (H) and electric (E) fields, near-field electric-induction (NFEI), where the transmitter and receiver are coupled by electric (E) fields, and near-field magnetic-induction (NFMI/NFC), where the transmitter and receiver are coupled by magnetic (H) fields. While RF wireless communication is accomplished by propagating an RF plane wave through free space, NFEMI, NFEI, NFMI and NFC communicates using non-propagating quasi-static E and/or H field signals.

In various example embodiments, a first near-field antenna includes a near-field electric-induction antenna (e.g. such as either a NFEI or NFEMI antenna) and is configured for on-body communications. A second near-field antenna includes a near-field magnetic-induction antenna (e.g. such as an NFC antenna) and is configured for off-body communications.

For example, an on-body sensor in the first near-field wireless device can be configured to communicate the sensor's readings to a second on-body near-field wireless device that collects the sensor's readings and perhaps other user information as well. A third off-body wireless device could be a smartphone/NFC reader that energizes the second on-body near-field wireless device that collected the sensor's readings, and thereby prompts the second on-body near-field wireless device to transmit the collected the sensor's readings to the smartphone/NFC reader.

Note, while example embodiments discussed herein refer to a user's body, on-body and off-body, in alternate embodiments the near-field device 100, body is herein broadly defined to include at least: a human's body, an animal's body, a body of a living organism, a body structure of an inanimate object, a robot, a vehicle, a docking system, a physical coupling system, a station on an assembly line, and so on.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Although on and off body communication may achieve high energy efficiency while communicating, a quality and/or robustness of near-field communication may be impaired by noise energy in the near-field frequency band generated from a wide variety of sources (e.g. a computer keyboard, a computer monitor, a touch-pad/screen, a smartphone being used, etc.) that can disturb and/or interfere with communications between various sets of near-field communications devices.

Now discussed are near-field based wireless devices for detecting and modulating their data transmissions based on quasi-periodic patterns in near-field noise/interference levels. Research has indicated that various wireless signal generating devices (e.g. household, computer, vehicular, etc.) also create noise in either or both of the near-field magnetic and electric signal band. The near-field noise has a burst/quiescent pattern that the near-field based wireless devices discussed below detect and adapt for to improve a reliability and robustness of near field communication device.

Quasi-periodic is herein defined to include a pattern (e.g. burst/quiescent pattern) that has a varying burst and/or quiescent statistical period/duration over a first period of time, but has a more stable burst and/or quiescent statistical period/duration over a second period of time. In some example embodiments, the first period of time is shorter than the second period of time, but in other example embodiments, the first period of time is longer than the second period of time.

Note, while various example embodiments discussed herein refer to a "user", in alternate embodiments the near-field device 100 can be taken exclusive possession of by other items, entities, etc. such as by: a robot, a vehicle, a docking system, a physical coupling system, a station on an assembly line, and so on.

FIG. 1 is a first example of a near-field wireless device 100. The first example near-field wireless device 100 includes a near-field antenna 102, a tuning circuit 104, a controller 108 having a near-field noise detector 114, and a transceiver circuit 112.

The near-field antenna 102 in various example embodiments can be either an NFEMI, NFEI, NFC, or NFMI antenna. As such the antenna 102 may include a coil (H-field) antenna for magnetic fields, in conjunction with a short loaded dipole (E-field) antenna for electric fields. The H-field antenna may include a ferrite core wound with wire or may be a planar design. The E-field antenna may include one or two conductive loading structures/plates. The antenna 102 would include two or more feed-points designed to be coupled to various transceiver circuitry, such as the tuning circuit 104 and/or other downstream radio transmitter and receiver integrated circuits (RF-IC) (not shown).

The controller 108 is configured to monitor and maintain the device's 100 operational resonance frequency and operational bandwidth/quality factor of the near-field signals (e.g. NFEI or NFEMI) carried by the near-field antenna. The controller 108 is configured to adjust the tuning parameters if either the operational resonance frequency is different from a preselected resonance frequency and/or the operational bandwidth is different from a preselected bandwidth.

The controller 108 is also configured to detect and monitor near-field noise received from various interference sources, characterize patterns in (e.g. identify a set of attributes of) the near-field noise (e.g. as having a noise burst portion/period, a quiescent/minimal-noise portion/period, or other types of attributes), and generate various synchronization/adaptation signals based on these patterns/attributes.

The tuning circuit 104 is configured to adjust the device's 100 resonance frequency using a capacitive bank (C-bank), and bandwidth using a resistive bank (R-bank) in response to signals from the controller 108. The C-bank and R-bank discretes are in some examples about 130 pF and 5000 ohms respectively to support the required resonance frequency (e.g. 10.6 MHz) and bandwidth (e.g. 400 KHz). The controller 108 is configured to adjust (e.g. increment/decrement) the C-bank and R-bank values using the tuning circuit 104.

The transceiver circuit 112 is configured to receive and transmit near-field communications signals to and from various other baseband circuitry (not shown).

The near-field noise detector 114 is coupled to receive near-field signals from a receiver portion of the transceiver circuit 112 and identify the near-field noise. The near-field noise detector 114 in various example embodiments can include ether basic or complex circuits that characterize the near-field noise in various ways. In some example embodiments the near-field noise detector 114 can dynamically identify attributes such as a noise-burst portions/periods and quiescent periods/portions in the near-field noise. These or other attributes can be statistically updated as quickly or slowly as needed depending upon a robustness of the near-field communications link required. In other example embodiments the near-field noise detector 114 can further characterize the near-field noise over perhaps much longer periods and/or identifying other portions or sub-portions than just a burst and quiescent portion.

The controller 108, based on the burst and quiescent portions identified by the near-field noise detector 114, then configures the transceiver circuit 112 to transmit near-field communications signals at a specific time and for a specific duration synchronized with the quasi-periodic nature of the near-field burst-noise/interference so as to provide lowest possible packet error rate.

For example, the specific time can be set so that a start of near-field communications signal transmission is synchronized with an end of an interference burst in the near-field noise signal pattern. The specific duration of the near-field communications signal transmission is, in some example embodiments, set smaller than a mean, standard deviation, median, etc. of a quiescent time interval between the noise/interference bursts.

Figure 2:
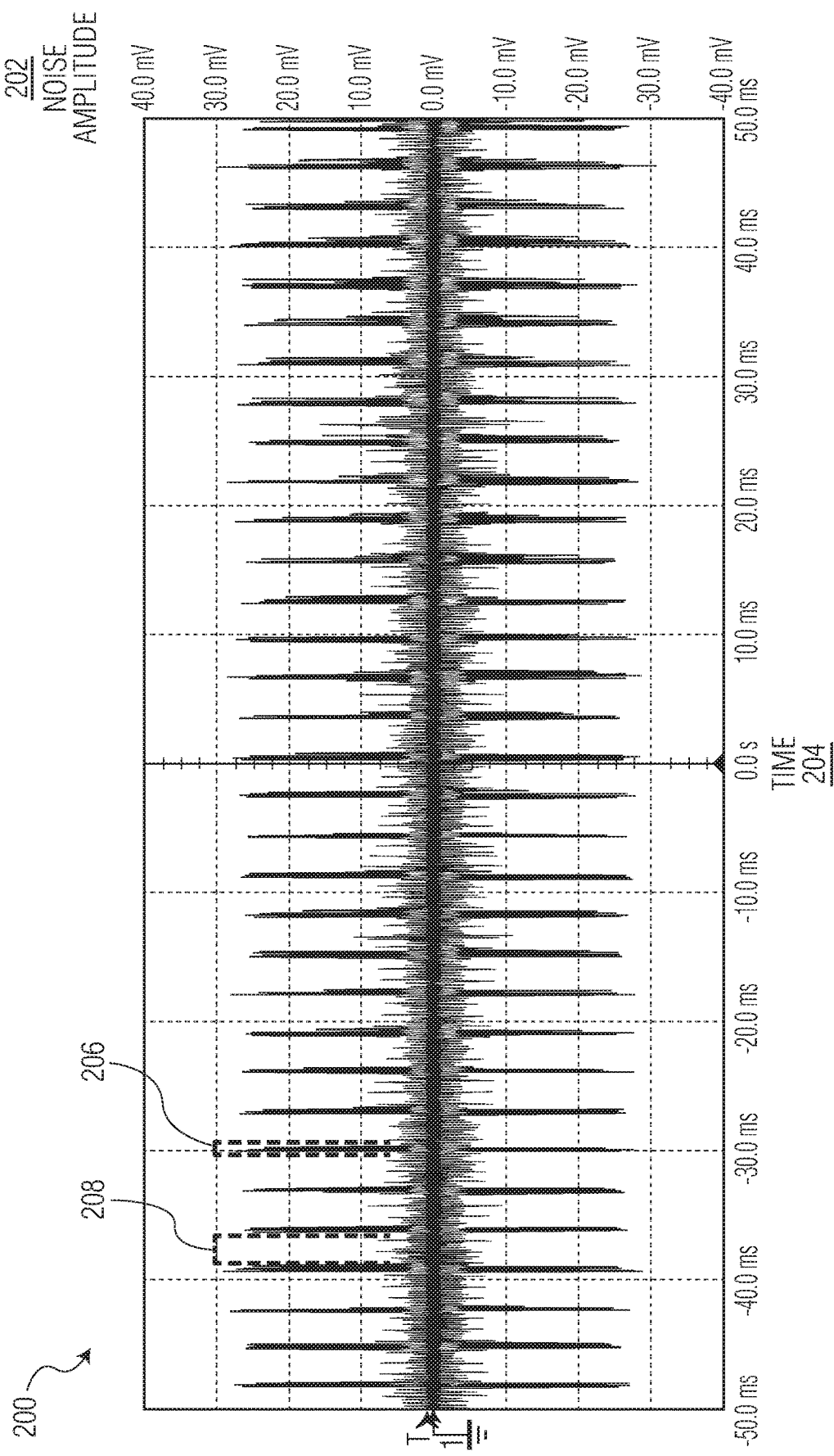
FIG. 2 is a first example set of near-field noise.
Figure 3:
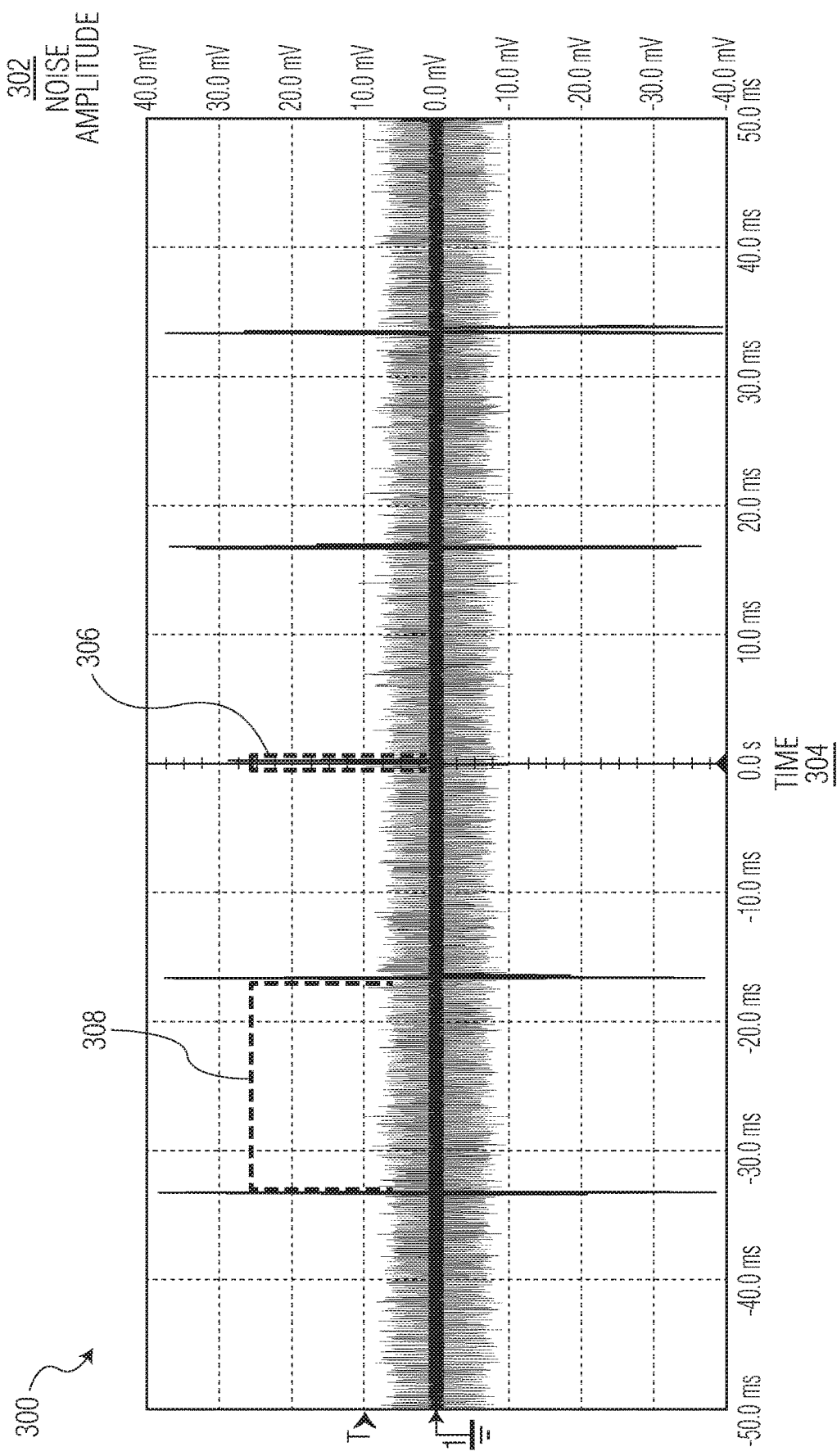
FIG. 3 is a second example set of near-field noise.
Figure 4:
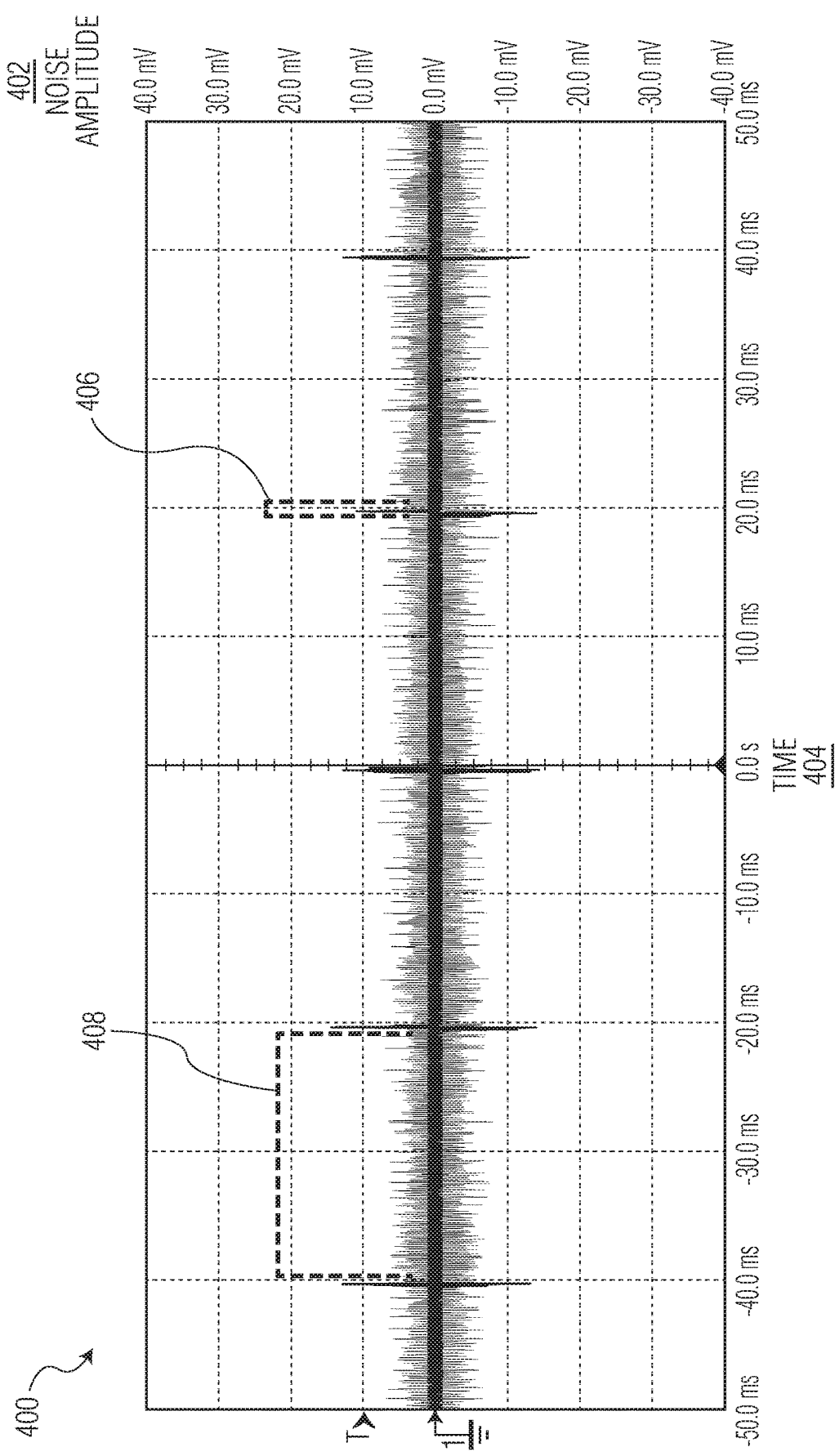
FIG. 4 is a third example set of near-field noise.

FIGS. 2, 3 and 4 to follow show examples of near-field noise that have quasi-periodic burst and quiescent noise periods/portions.

FIG. 2 is a first example 200 set of near-field noise. The example 200 includes a noise amplitude 202 varying over time 204 and having a burst portion/period 206 and a quiescent portion/period 208.

In this example 200 the set of near-field noise corresponds to a user touching/typing on a computer keyboard with their fingers. The near-field antenna 102 is positioned near the user's wrist (e.g. like a smartwatch would be). As shown, the near-field noise (e.g. interference) has a quasi-periodic characteristic with bursts portions/periods 206 and quiescent portions/periods 208 in between where significantly less interference is present. These burst and quiescent portions/periods may be relatively stable or dynamically variable.

FIG. 3 is a second example 300 set of near-field noise. The example 300 includes a noise amplitude 302 varying over time 304 and having a burst portion/period 306 and a quiescent portion/period 308.

In this example 300 the set of near-field noise corresponds to a user touching a display monitor (e.g. laptop touch-screen) with their fingers. The near-field antenna 102 is similarly positioned near the user's wrist. As shown, the near-field noise (e.g. interference) has a quasi-periodic characteristic with bursts portions/periods 306 and quiescent portions/periods 308 in between where significantly less interference is present.

FIG. 4 is a third example 400 set of near-field noise. The example 400 includes a noise amplitude 402 varying over time 404 and having a burst portion/period 406 and a quiescent portion/period 408.

In this example 400 the set of near-field noise corresponds to a user touching a touchpad of a portable computer (e.g. tablet computer) with their fingers. The near-field antenna 102 is also positioned near the user's wrist. As shown, the near-field noise (e.g. interference) has a quasi-periodic characteristic with bursts portions/periods 406 and quiescent portions/periods 408 in between where significantly less interference is present.

Figure 5:
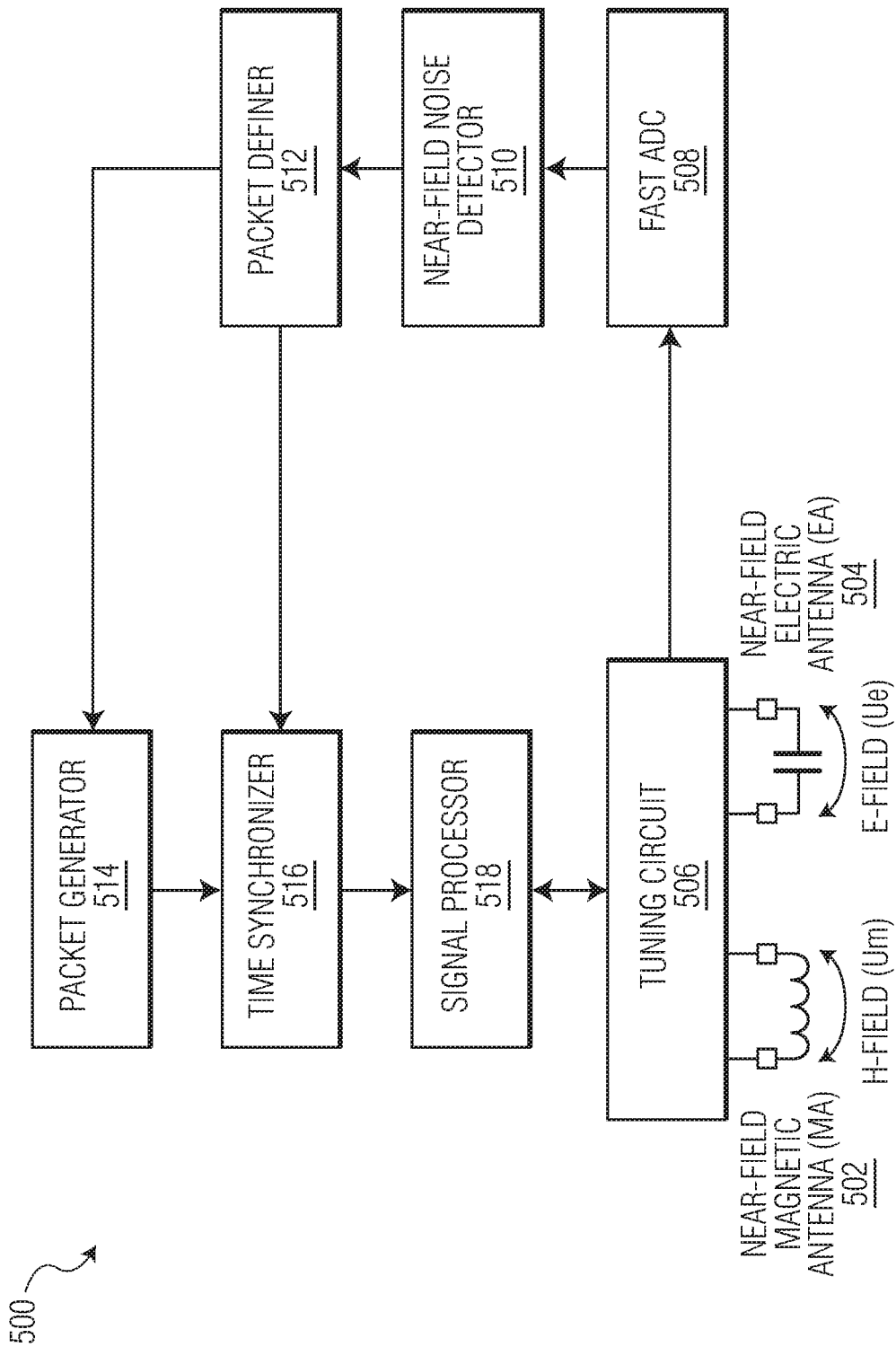
FIG. 5 is a second example of the near-field wireless device.

FIG. 5 is a second example 500 of the near-field wireless device. The example 500 includes a near-field magnetic antenna (MA) 502, a near-field electric antenna (EA) 504, a tuning circuit 506, a Fast ADC 508, a near-field noise detector 510, a packet definer 512, a packet generator 514, a time synchronizer 516, and a signal processor 518.

The near-field magnetic antenna (MA) 502 and the near-field electric antenna (EA) 504 receive and transmit near-field communications signals and are coupled to the tuning circuit 506. However in an alternate example embodiment, near-field magnetic antenna (MA) 502 and the near-field electric antenna (EA) 504 may be coupled together to a signal shared pair of nodes instead of the four nodes shown.

The signal processor 518 is coupled to receive near-field communications signals from the tuning circuit 506 and route such signals to other baseband components (not shown). The signal processor 518 is also coupled to receive near-field communications signals to be transmitted from the time synchronizer 516 and the packet generator 514 and route such signals to the tuning circuit 506 for transmission by the antennas 502, 504.

The fast analogue to digital convertor (ADC) 508 is connected to the tuning circuit 506 and receives near-field signals, including near-field noise, from a low noise amplifier (LNA) (not shown) in the tuning circuit 506. The Fast ADC 508 is coupled to the near-field noise detector 510 which analyzes the receives near-field signals for the near-field noise and patterns (i.e. burst and quiescent) therein.

The near-field noise detector 510 is configured to operate in a manor similar to the near-field noise detector 114 discussed in FIG. 1. For example, in various embodiments the near-field noise detector 510 can include ether basic or complex circuits that characterize the near-field noise in various ways. The near-field noise detector 510 can dynamically identify a transitory burst and quiescent periods/portions in the near-field noise that are statistically updated as quickly or slowly as needed depending upon a selected near-field communications link robustness required. In other example embodiments the near-field noise detector 510 can further characterize the near-field noise over perhaps much longer periods and/or identifying other portions or subportions than just a burst and quiescent portion.

The packet definer 512, based on the burst and quiescent portions identified by the near-field noise detector 510, then commands the packet generator 514 to set a data packet length and/or commands the time synchronizer 516 to set a timing for when each data packet is transmitted. Thus the data packets are transmitted with a length and transmission timing that is synchronized with the quasi-periodic nature of the near-field noise/interference so as to provide lowest possible packet error rate.

Figure 6:
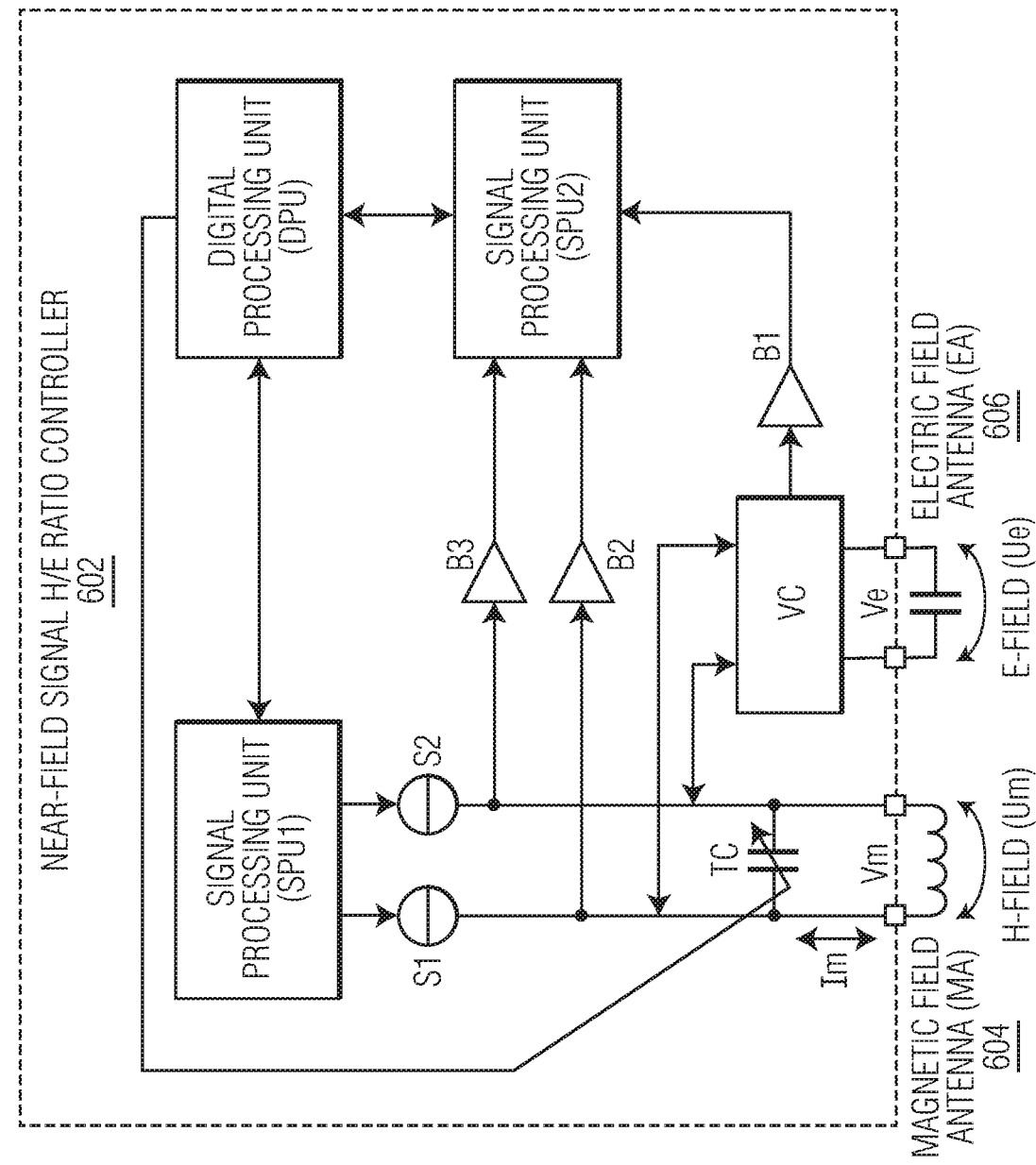
FIG. 6 is a third example of the near-field wireless device.

For example, the timing can be set so that a start of data packet transmission is synchronized with an end of an interference burst in the near-field noise signal pattern. Packet size in some example embodiments is set smaller than a mean, standard deviation, median, etc. quiescent time interval between the noise/interference bursts FIG. 6 is a third example 600 of the near-field wireless device with H-field to E-field (H/E) ratio control using a ratio controller coupled to a.

The ratio controller 602 is coupled to a near-field magnetic antenna (MA) 604 and a near-field electric antenna (EA) 606. The ratio controller 602 also include elements for detecting patterns in near-field noise (e.g. perhaps distributed between a signal processing unit (SPU2) and a digital processing unit (DPU) and related circuits) and synchronizing transmission of near-field communication signals during the quiescent portions of the near-field noise (e.g. perhaps distributed between the digital processing unit (DPU) and a signal processing unit (SPU1) and related circuits).

The ratio controller 602 operates on the following two principles. The first principle is that an NFEMI antenna's H-field signal, is not as attenuated by intervening structures (e.g. a conductive structure, a human body, an object, etc.) as the E-field signal is, but can have a relatively shorter communications range than the NFEMI antenna's E-field signal. The second principle is that the NFEMI antenna's E-field signal, has a greater range than the NFEMI antenna's H-field signal, but is more attenuated by intervening structures than the H-field signal is.

Thus for NFEMI antenna nodes wholly or partially blocked by a structure, decreasing a ratio of energy in the E-field signal to energy in the H-field signal better enables the NFEMI antenna to still communicate through the structure. In some example embodiments, the ratio is set to less than one (i.e. Amplitude (E-field)/Amplitude (H-field)<1). This ratio apportions the NFEMI's transmit and/or receive energy primarily or completely to the H-field component during near-field communications such front-to-back node communications on a human body.

However for nodes not wholly or partially blocked by a structure but separated by a greater distance, a ratio between the E-field and the H-field amplitudes is increased and thus better enables the NFEMI antenna to also still communicate over longer distances. In some example embodiments, the ratio set to greater than one (i.e. Amplitude (E-field)/Amplitude (H-field)>1). This ratio apportions the NFEMI's transmit and/or receive energy primarily or completely to the E-field component during such head-to-toe node communications on a human body.

The ratio may be calculated in various ways such as: electric field (E-field) energy divided by magnetic field (H-field) energy, electric field (E-field) amplitude divided by magnetic field (H-field) amplitude, and/or electric field (E-field) phase subtracted by magnetic field (H-field) phase (e.g. phase ratio=$e^{i(ph_E - ph_H)}$).

Thus the H-field holds an important advantage where communication is required between nodes separated by structures (e.g. front-to-back of a body) and/or in a noisy E-field environment. The E-field however holds an important advantage in where communication is required between nodes that are positioned further from each other along a structure (e.g. head-to-toe, chest-to-foot, etc.) and/or in a noisy H-field environment. The ratio controller 602 modulates the H-field to E-field energy ratio using devices such as an RF-IC (integrated circuit) or an Electromagnetic Induction Radio (EIR).

In the example embodiment of FIG. 6, the ratio controller 602 includes a digital processing unit (DPU), signal processing units SPU1 and SPU2, signal generators S1 and S2, buffers B1, B2, B3, a magnetic field antenna coil (MA), and an electric field antenna (EA) (e.g. a capacitor).

The DPU controls the operation of the ratio controller 602 and processes the signals related to the near-field communication. Signal processing units SPU1 and SPU2 contain hardware to interface to the antennas MA, EA and the DPU. SPU1 and SPU2 are connected to additional baseband circuitry (not shown) that either generates or receives the data in the near-field signals. SPU1 generates near-field transmit signals and SPU2 receives near-field signals.

In transmit mode, the H-field (Um) is generated by a first alternating current (Im) through (i.e. first alternating voltage (Vm) across) the magnetic antenna MA, while the E-field (Ue) is generated by a second alternating voltage (Ve) on the electric antenna EA. The two voltages Vm and Ve thus define the H-field (Um) and E-field (Ue) respectively. Changing one of the amplitudes of Vm and Ve or a phase between them, changes a ratio of signal strengths between the H-field and the E-field. Blending of these fields improves the robustness and performance of the wireless communication system.

Signal processing unit SPU1 commands signal generators S1 and S2 to produce currents that drive the resonating circuit formed by coil MA and tuning capacitor (TC). Sources S1 and S2 generate the near-field signal to be transmitted.

The ratio of signal strengths between the H-field and the E-field can in some example embodiments be controlled by a voltage processing unit (VC). The voltage processing unit (VC) modulates, in either transmit or receive modes, the voltage Vm on the magnetic antenna MA and voltage Ve on the electric antenna EA. The VC may reduce or increase either an amplitude or phase of voltage Ve relative to Vm. In this way the ratio between the H-field and the E-field may be changed depending upon which pair of NFEMI nodes are communicating.

In receive mode the voltages received by the magnetic MA and electric EA antennas may be combined, amplitude modulated and/or phase modulated.

Thus the ratio controller 602 enables robust node to node NFEMI communication in response to the near-field noise by varying the ratio of the E-field to the H-field depending upon which node is communicating to which node and the timing and length of the near-field noise burst and quiescent portions. A different ratio can be used for each pair of communicating nodes.

The exact ratio used between a particular set of near-field nodes depends upon: a distance between the nodes, attenuation due to a structure between the nodes, a near-field noise burst portion, and/or a near-field noise quiescent portion. In this way node to node communications can be optimized and a signal to noise ratio maximized.

Thus these various example near-field wireless device embodiments provide a way of improving a robustness of a near-field data signal link in an otherwise noisy signal environment. This is particularly important in many medical applications.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A first near-field wireless communications device, comprising:
   a near-field antenna configured to wirelessly receive electromagnetic radiation;
   a near-field noise detector coupled to receive a first set of near-field signals from the near-field antenna;
   wherein the near-field noise detector is configured to identify a set of near-field noise attributes within the first set of near-field signals;
   a controller coupled to the near-field noise detector and configured to generate at least one synchronization signal based on at least one of the attributes of the near-field noise; and
   a transmitter circuit coupled to both the controller and the near-field antenna, and configured to wirelessly transmit a second set of near-field signals through the near-field antenna to a second near-field wireless communications device located external to the first near-field wireless communications device in response to the synchronization signal;
   wherein the set of attributes of the near-field noise includes a burst portion and a quiescent portion; and
   wherein the controller is configured to command the transmitter circuit to set a data packet length of the second set of near-field signals based on either a mean, median, or standard deviation of a duration of the quiescent portion of the near-field noise.

2. The device of claim 1:
   wherein the synchronization signal includes a timing command; and
   wherein the transmitter circuit is configured to transmit the second set of near-field signals at a time specified in the timing command.

3. The device of claim 1:
   wherein the synchronization signal includes a timing command;
   wherein the second set of near-field signals are divided into a set of data packets; and
   wherein the timing command specifies a time that at least one of the data packets in the set of data packets is to be transmitted.

4. The device of claim 1:
   wherein the synchronization signal includes a data packet length command;
   wherein the second set of near-field signals are divided into a set of data packets; and
   wherein the transmitter circuit is configured to set a length of at least one of the data packets to a data packet length specified in the data packet length command.

5. The device of claim 1:
wherein the synchronization signal includes both a timing command and a data packet length command;
wherein the second set of near-field signals are divided into a set of data packets;
wherein the transmitter circuit is configured to set a length of at least one of the data packets to a data packet length specified in the data packet length command; and
wherein the timing command specifies a time that at least one of the data packets in the set of data packets is to be transmitted.

6. The device of claim 1:
wherein the set of attributes correspond to a quasi-periodic pattern in the near-field noise.

7. The device of claim 1:
wherein the controller is configured to statistically characterize the set of attributes in the near-field noise over a predetermined time period.

8. The device of claim 1:
wherein the controller is configured to command the transmitter circuit to begin transmission of the second set of near-field signals on the near-field antenna after a predetermined delay following an end of the burst portion of the near-field noise.

9. The device of claim 8:
wherein the controller is configured to set the predetermined delay based on either a mean, median, or standard deviation of a duration of the burst portion of the near-field noise.

10. The device of claim 1:
wherein the controller is configured to command the transmitter circuit to begin transmission of the second set of near-field signals on the near-field antenna after a predetermined delay following a start of the burst portion of the near-field noise.

11. The device of claim 1:
wherein the data packet length varies as either the burst portion or the quiescent portion of the near-field noise signal vary.

12. The device of claim 1:
wherein the near-field antenna includes an electric (E) near-field antenna and a magnetic (H) near-field antenna;
wherein the near-field noise includes near-field electric noise; and
wherein the controller is configured to generate the synchronization signal based only on the pattern in the near-field electric noise.

13. The device of claim 1:
wherein the near-field antenna includes an electric (E) near-field antenna and a magnetic (H) near-field antenna;
wherein the near-field noise includes near-field magnetic noise; and
wherein the controller is configured to generate the synchronization signal based only on the pattern in the near-field magnetic noise.

14. The device of claim 1:
wherein the near-field antenna includes an electric (E) near-field antenna and a magnetic (H) near-field antenna;
wherein the near-field noise includes both near-field electric noise and near-field magnetic noise; and
wherein the controller is configured to generate the synchronization signal based on the pattern in both the near-field electric noise and the near-field magnetic noise.

15. The device of claim 1:
wherein the near-field antenna includes an electric (E) near-field antenna and a magnetic (H) near-field antenna; and
wherein the controller is configured to modulate a ratio of energy sent to and/or received from each of the electric and magnetic antennas in response to a ratio of near-field electric noise and near-field magnetic noise.

16. The device of claim 1:
wherein the device is embedded in at least one of: a smart phone, a smart watch, a sensor, a medical sensor, an earbud, or an audio device.

17. The device of claim 1:
wherein the near-field antenna includes at least one conductive surface; and wherein the conductive surface is configured to carry non-propagating quasi-static near-field electric induction signals.

18. The device of claim 1:
wherein the near-field antenna includes at least one coil; and
wherein the coil is configured to carry non-propagating quasi-static near-field magnetic induction signals.

19. A near-field wireless communications device, comprising:
a near-field antenna configured to wirelessly receive electromagnetic radiation;
a near-field noise detector coupled to receive a first set of near-field electromagnetic signals from the near-field antenna;
wherein the near-field noise detector is configured to identify a set of near-field noise attributes within the first set of near-field signals;
a controller coupled to the near-field noise detector and configured to generate at least one synchronization signal based on at least one of the attributes of the near-field noise; and
a transmitter circuit coupled to both the controller and the near-field antenna, and configured to wirelessly transmit a second set of near-field electromagnetic signals on the near-field antenna in response to the synchronization signal;
wherein the set of attributes of the near-field noise includes a burst portion and a quiescent portion; and
wherein the controller is configured to command the transmitter circuit to set a data packet length of the second set of near-field signals based on either a mean, median, or standard deviation of a duration of the quiescent portion of the near-field noise.

\* \* \* \* \*